US012800054B2

(12) United States Patent
Hoffmann et al.

(10) Patent No.: US 12,800,054 B2
(45) **Date of Patent: *Nov. 17, 2026**

(54) SOLENOID VALVE WITH IMPROVED AIRFLOW AND METHOD FOR THE PRODUCTION THEREOF

(71) Applicant: Knorr-Bremse Systeme Fuer Nutzfahrzeuge GmbH, Munich (DE)

(72) Inventors: Christoph Hoffmann, Gaeufelden (DE); Friedbert Roether, Cleebronn (DE); Kevin Kunert, Rutesheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 86 days.

This patent is subject to a terminal disclaimer.

(21) Appl. No.: 18/859,360

(22) PCT Filed: Mar. 31, 2023

(86) PCT No.: PCT/EP2023/058528
§ 371 (c)(1),
(2) Date: Oct. 23, 2024

(87) PCT Pub. No.: WO2023/208520
PCT Pub. Date: Nov. 2, 2023

(65) Prior Publication Data
US 2026/0185629 A1 Jul. 2, 2026

(30) Foreign Application Priority Data
Apr. 29, 2022 (DE) ..................... 10 2022 110 447.8

(51) Int. Cl.
*F16K 31/06* (2006.01)

(52) U.S. Cl.
CPC ...... *F16K 31/0627* (2013.01); *F16K 31/0606* (2013.01)

(58) Field of Classification Search
CPC ............. F16K 31/0606; F16K 31/0627; F16K 31/0693; F16K 31/0696; F16K 31/0686
See application file for complete search history.

(56) References Cited

U.S. PATENT DOCUMENTS 3,324,889 A * 6/1967 Batts .................. F16K 31/0627 137/625.69
3,733,047 A * 5/1973 Allen .................... F16K 11/044 137/625.5

(Continued)

FOREIGN PATENT DOCUMENTS

DE 3314722 C1 6/1984
DE 10251851 A1 2/2004

(Continued)

OTHER PUBLICATIONS

International Search Report for PCT/EP2023/058528, Issued Jun. 9, 2023.

*Primary Examiner* — Matthew W Jellett
(74) *Attorney, Agent, or Firm* — NORTON ROSE FULBRIGHT US LLP

(57) ABSTRACT

A solenoid valve including a first connection, a second connection and a third connection. The solenoid valve includes at least one closure part for opening and closing the first connection and the second connection; an armature for moving the at least one closure part, in which the armature extends around the at least one closure part in a cylindrical shape; and a coil for moving the armature. The armature has a section protruding axially over the at least one closure part, having a through-opening and an axially running side channel to guide an air flow from the first connection to the third connection.

14 Claims, 2 Drawing Sheets

(56) References Cited

U.S. PATENT DOCUMENTS

| | | | | |
|---|---|---|---|---|
| 4,523,739 | A * | 6/1985 | Johansen | F16K 31/0696 251/129.21 |
| 4,531,708 | A * | 7/1985 | Livet | F16K 31/0651 251/48 |
| 5,503,185 | A * | 4/1996 | Krause | F16K 31/0627 251/129.21 |
| 5,553,829 | A * | 9/1996 | Hemsen | F16K 31/0696 251/129.21 |
| 5,810,330 | A * | 9/1998 | Eith | B60T 8/4881 303/119.2 |
| 6,425,409 | B1 * | 7/2002 | Cross | F16K 31/0606 137/884 |
| 7,128,089 | B2 * | 10/2006 | Bente | F16K 31/0655 251/83 |
| 8,313,084 | B2 * | 11/2012 | Reiter | F16K 31/0651 239/585.4 |
| 9,052,026 | B2 * | 6/2015 | Leidig | F16K 31/0655 |
| 11,110,905 | B2 * | 9/2021 | Jeon | B60T 15/043 |
| 12,181,067 | B2 * | 12/2024 | Jerschl | F16K 31/0658 |
| 12,276,351 | B2 * | 4/2025 | Beuschel | H01F 7/1607 |
| 2014/0084194 | A1 * | 3/2014 | Kibune | F16K 27/029 251/129.15 |
| 2020/0018417 | A1 | 1/2020 | Ho | |

FOREIGN PATENT DOCUMENTS

| | | | |
|---|---|---|---|
| EP | 0418502 | A2 | 3/1991 |
| JP | 2011233790 | A | 11/2011 |

* cited by examiner

SOLENOID VALVE WITH IMPROVED AIRFLOW AND METHOD FOR THE PRODUCTION THEREOF

FIELD OF THE INVENTION

The present invention concerns a solenoid valve with improved airflow and a method for production thereof, and in particular a 2/3 way valve with an airflow via bore holes.

BACKGROUND INFORMATION

Solenoid valves are used for example as 2/3 way valves for pressure control of anti-lock braking systems (ABS) or traction control systems (ASR) in trucks or buses. These solenoid valves are exposed to intensive loads during operation and must function reliably for many actuations.

Because of the high stress, conventional solenoid valves show significant wear over time so that reliable switching (opening and/or closing) is no longer possible, or only inadequately. In particular, because of the sudden switching processes and the resulting high forces, caused amongst others by pressure differences, frequently mechanical abrasion occurs on the valve seats and/or closing parts. This wear may be further aggravated by the airflow, i.e. by the deflection of air streams inside the valve. In conventional valves, it has been found that over time, the used parts can often only inadequately withstand the powerful air streams.

There is therefore a need for alternative structures for solenoid valves which firstly allows simple production and secondly can ensure a reliable function throughout the service life.

SUMMARY OF THE INVENTION

At least some of the above-mentioned problems may be solved by a solenoid valve according to the description herein and a production method according to the description herein. The further disclosures herein define further advantageous embodiments of the subjects of the main descriptions herein.

The present invention concerns a solenoid valve comprising a first connection, a second connection and a third connection. The solenoid valve comprises at least one closing part for opening and closing the first connection and the second connection, an armature for moving the at least one closing part, and a coil for moving the armature. The armature extends as a cylinder around the at least one closing part. The armature has a portion protruding axially over the at least one closing part, having a passage opening and an axially running side channel (e.g. a groove) in order to conduct an air stream from the first connection to the third connection. In this way, the solenoid valve becomes a 3/2 way solenoid valve.

A passage opening may be defined as a passage for an air stream, having an edge closed in a cross-section perpendicular to the air stream. It is not therefore a notch or indentation, but e.g. a bore or punched hole. The closing part may be formed as one piece or of multiple pieces, and serve as a sealing plug or plugs for reliably sealing the corresponding valve seat. The plugs may be formed flat or conically tapering in order to achieve a good seal. The movement direction of the armature defines an axial direction.

Optionally, the solenoid valve comprises a core in which the first connection is formed as a passage opening and forms a valve seat. The armature may have a (partially)

closed end face towards the core. Optionally, the end face of the armature may form a cone. The core may optionally form an inner cone on the side facing the armature. This enlarges a magnetic surface. The inner cone of the core and/or the cone of the armature may each be formed by two angled regions.

With this embodiment, the following technical effects may be achieved. Firstly, the guidance of the magnetic field lines changes. The double cone geometry of core and armature leads to the magnetic force rather reducing on small distances between armature and core, but increasing on larger distances between core and armature. This has a positive effect on the switching behavior of the valve, since the valve can be reliably closed without excessive forces acting on the core when the closing part meets the valve seat. In comparison with conventional armatures which have a slotted armature geometry (i.e. without passage holes), the magnetic force is therefore increased in the case of larger distances because of the cohesive end face of the armature facing the core. Because of the closed pole face on the armature, the magnetic force is generally increased, which also contributes to a secure movement of the armature through the coil. As a whole therefore, by influencing the characteristic curves in the case of greater distances between core and armature, a higher magnetic force can be achieved. Thus a movement of the armature through the coil is guaranteed even for greater distances between core and armature. It may thus be ensured that even in the case of large distances, the magnetic force is greater than the spring force of the compression spring between armature and core.

Optionally, the at least one closing part comprises a first closing part and a second closing part. The first closing part is coupled to the armature and opens or closes the first connection on a movement of the armature. The second closing part is coupled to the armature and closes or opens the second connection on a movement of the armature. The solenoid valve may furthermore have at least one damping spring which is arranged between the first closing part and the second closing part and is configured to damp the closure of the first connection and/or the second connection.

The passage opening may be a first passage opening, and the armature may optionally have a second passage opening in a region which is formed axially between the first closing part and the second closing part, in order to provide a pressure balance between an inner region of the cylindrical armature and the third connection.

Optionally, the first passage opening and the second passage opening are identical bores. Identical may mean that they can be produced with a same tool (e.g. drill) and do not therefore differ except in position. Optionally, also multiple first passage bores and/or multiple second passage bores may be formed in order to better distribute the air stream.

Optionally, the first and second closing parts each comprise a head-shoulder region for closing the associated first or second connection. The armature may have a protrusion extending radially into the interior and, at an opposite end, an annular recess with a stop element. The protrusion may be configured to form a stop for the head-shoulder region of the first closing part. The recess may be configured, after insertion of the first closing part, the damping spring and the second closing part, to fix the second closing part relative to the axial direction via the stop element.

Optionally, the stop element is a disc which is fixed inside the recess by upsetting an edge of the armature. It need however not be a cohesive disc. It is sufficient if an axial stop is formed for the second closing part. It should however not be completely fixed.

The first closing part may also be identical to the second closing part. This offers the advantage that only one type of closing part need be produced. After insertion, the two closing parts are merely rotated through 180° relative to one another. This allows simple and low-cost production. Only a damping spring need be arranged between the first closing part and the second closing part, which spring presses the first closing part and the second closing part away from one another.

The solenoid valve may have a chamber into which the armature together with the at least one closing part is linearly movable, and the first, second and third connections provide a connection into the chamber (e.g. via external connection parts). In an energized state of the coil, the at least one closing part may close the first connection and create a fluidic connection via the chamber between the second connection and the third connection. In a non-energized state of the coil, the at least one closing part may close the second connection and create a fluidic connection via the chamber between the first connection and the third connection.

Exemplary embodiments also concern a method for production of a solenoid valve as defined above, which has a first connection, a second connection, a third connection, an armature with a cylindrical interior, and a coil for moving the armature. The method comprises:

provision of the armature with a side channel;

formation of a passage bore through the armature; and insertion of at least one closing part in the armature, wherein after the insertion step, the armature has a portion protruding axially over the at least one closing part, and the passage bore is formed in the protruding portion in order to conduct an air stream from the first connection to the third connection.

Optionally, the passage bore is a first passage bore and the at least one closing part comprises a first closing part and a second closing part. The method may furthermore comprise formation of a second passage bore in a region of the armature which lies axially between the first closing part and the second closing part. The same tool may be used for this.

It is understood that all above-described features of the solenoid valve may be achieved by further optional method steps. It is also understood that the order in which the steps are listed is not necessarily an order of performance of the method steps. The steps may also be performed in a different order, or only some method steps performed.

Exemplary embodiments of the present invention overcome the problems cited initially by the use of bores which can be formed in (only) one working step and do not reduce the stability of the armature. With slots and notches, instead burrs may form which would have to be removed in complex fashion.

If multiple closing parts are used, the (only) one spring offers the advantage that the stop damps both closing parts on the valve seats. This is possible for example because the two connections are closed on opposite sides and can be damped by a single compression spring.

Exemplary embodiments furthermore offer the advantage that the double damping significantly extends the useful life of the solenoid valve. Less damage occurs, and opening and closing take place with high precision. Therefore the solenoid valves are suitable for applications which require a high number of switching processes, as is the case for example with ABS solenoid valves.

A further advantage of exemplary embodiments is that both closing parts may have a same configuration and can therefore be made interchangeable. This significantly simplifies and cheapens production. A cost saving is also achieved in that fewer parts are required because of the double damping.

The same applies to the formation of passage openings which may be formed by similar bores, since both the passage opening in the central region between the two closing parts and also that in the upper end region can be produced in a same working step using a same tool. In some exemplary embodiments, the outer groove along the armature may already exist in the pre-material (bar material), which also shortens the production process and production time.

The exemplary embodiments of the present invention will be better understood from the following detailed description and the appended drawings of the various exemplary embodiments, which should not however be interpreted so as to restrict the disclosure to the specific embodiments but serve merely for clarification and understanding.

DETAILED DESCRIPTION

Figure 1:
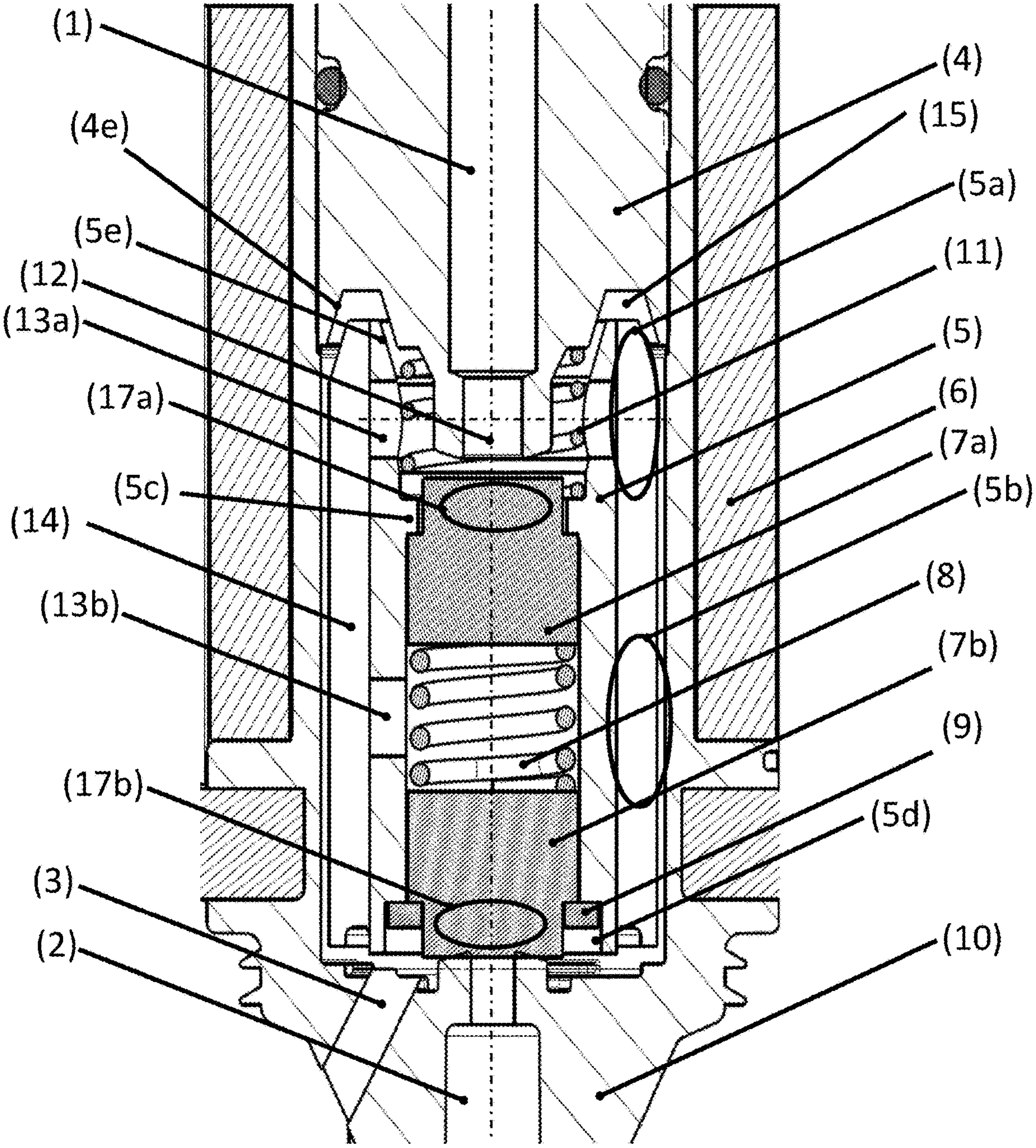
FIG. 1 shows a solenoid valve according to an exemplary embodiment of the present invention.

FIG. 1 shows a valve with improved damping according to an exemplary embodiment of the present invention. The valve shown is a 3/2 way valve which can optionally connect together three connections by two switch positions. For this, the solenoid valve has a first connection 1, a second connection 2, a third connection 3, an armature 5, a coil 6, a first and a second closing part 7*a*, 7*b*, and a damping spring 8. The coil 6 serves to move the armature 5 (by magnetic forces). The first closing part 7*a* is coupled to the armature 5 and opens or closes the first connection 1 when the armature 5 is moved by the coil 6. The second closing part 7*b* is also coupled to the armature 5 and opens or closes the second connection 2 when the coil 6 moves the armature 5. The damping spring 8 is arranged between the first closing part 7*a* and the second closing part 7*b*. On closure of the first connection 1 and/or on closure of the second connection 2, the damping spring 8 damps the impact (or contact) on the corresponding valve seat. It thus improves damping and protects the closing parts 7*a*, 7*b* and the valve seats at the connections 1, 2.

The coil 6 may for example be accommodated in the valve body housing 10 and extend as a cylinder around a core 4 and the armature 5. The core 4 may for example be arranged fixedly inside the coil 8 and provide the first connection 1 as a passage opening. The armature 5 is displaceable in the axial direction (vertically in FIG. 1), wherein a compression spring 11, which generates a preload, is present between the core 4 and the armature 5. The armature 5 may for example have a protruding portion 5*a* which extends axially over the first closing part 7*a* and defines a cylindrical inner region, in which the compression spring 11 is guided and which receives a valve seat 12 of the first connection 1. A further advantage of the protruding portion 5*a* of the armature 5 is therefore that this creates installation space for the compression spring 11 between the armature 5 and the core 4. This makes the assembly more compact. In conventional solenoid valves, the compression spring is located externally on the armature and thus requires additional installation space. Also, a long groove in the core 4 between the valve seat and pole face would be much more complicated to produce than the protruding portion 5*a* of the armature 5, as formed in the exemplary embodiment.

The first and second closing parts 7*a*, 7*b* can move relative to the armature 5 by compression of the damping spring 8. This movement is however axially limited in both directions by a stop. For this, the first and second closing parts 7*a*, 7*b* each comprise a constricted region 17*a*, 17*b* which forms a shoulder-head region, wherein the head portion serves to close the associated first or second opening 1, 2 and the shoulder serves as a stop.

Also, the armature 5 comprises a protrusion 5*c* extending radially into the interior and forming the stop for the shoulder portion 17*a* of the first closing part 7*a*. The compression spring 11 may also act on this inner protrusion 5*c*, and press the armature 5 away from the core 4. At an opposite end, an annular recess 5*d* is formed in the armature 5. The annular recess 5*d* is formed such that, together with the head-shoulder region 17*b* of the second closing part 7*b*, an exemplary disc 9 can be inserted there and easily fixed for example by upsetting of the armature 5. Then the two closing parts 7*a*, 7*b* are fixed in the armature 5 by an axial stop.

In non-energized state of the coil 6, the compression spring 11 presses the armature 5 away from the core 4. Accordingly, the first closing part 7*a* opens the first connection 1, since the first closing part 7*a* is also moved with the stop 5*c*. At the same time, the preload force of the compression spring 11 is sufficient to move the armature 5 far enough for the armature 5 to close the opposite second connection 2 via the second closing part 7*b*. The positioning of the second closing part 7*b* on the second connection 2 is here damped via the damping spring 8.

When the coil 6 is energized and thus a magnetic field generated, the armature 5 is drawn magnetically in the direction of the core 4, against the spring tension of the compression spring 11, until the first closing part 7*a* closes the first connection 1. In this case, the stop transmits the force from the armature 5 through the disc 9 onto the second closing part 7*b*, which transmits the force to the first closing part 7*a* via the damping spring 8. The pressure force on closure of the first connection 1 is thus limited to the spring force of the damping spring 8 and hence the solenoid valve is protected.

As a result of this movement, either the second connection 2 or the first connection 1 is opened or closed. When the second connection 2 is open (energized state), a fluidic connection exists between the third connection 3 and the second connection 2. The third connection 3 may be formed in a base portion of the valve body 10 next to the second connection 2. No further measures are required for the airflow between the second and third connections 2, 3.

FIG. 1 shows only the switch position with open first connection 1. To conduct the air stream from the first connection 1 into the interior of the valve housing 10, the armature 5 has at least two passage openings 13 and at least one side channel 14 (formed e.g. as a groove). The at least two passage openings 13 connect an inner region of the armature 5 to the side channel 14 and provide a fluidic connection between the first connection 1 and the third connection 3. For example, at least one first passage opening 13*a* is formed in the protruding portion 5*a*, and at least one second passage opening 13*b* is formed in a region 5*b* of the armature 5 which is situated axially between the first closing part 7*a* and the second closing part 7*b*. The at least one second passage opening 13*b* provides a pressure balance between the inner region of the armature 5 and the third connection 3. The second passage opening(s) is/are situated axially at the level of the damping spring 8, and because of the pressure balance, the wear on the first closing part 7*a* and the second closing part 7*b* is reduced.

According to exemplary embodiments, the armature 5 comprises a (partly) closed end face 5*e* facing towards the core 4. The end face 5*e* of the armature 5 forms for example a cone. Similarly, the core 5 may form an inner cone 4*e* on the side facing the armature 5. This enlarges a magnetic surface. In particular, the inner cone 4*e* of the core 4 and the cone 5*e* of the armature 5 each form two angled regions. In this way, the end face of the armature 5 forms a fully or partly closed armature face opposite the pole face of the core 4. In comparison with conventional armatures with slotted pole faces, the magnetic force is increased by the larger pole face in exemplary embodiments.

The two pole faces may in particular be configured as a double cone or by angled regions (see FIG. 1) in order to generate the additional magnetic surfaces. The two pole faces formed in this way further enlarge the face of the armature 5 opposite the core 4 and hence increase the magnetic force for a larger air gap, since the armature characteristic curve is positively influenced by this geometry.

It is understood that multiple passage openings 13 and/or multiple side channels may be present in order to distribute the air streams as evenly as possible over the interior because of the considerable pressure ratios. The second connection 2 and the third connection 3 may be formed as passage openings in the valve body housing 10. Optionally, the core 4 may also be axially movable in the valve body 10, wherein its axial movement may be achieved via a separate controller.

In the exemplary embodiment shown, the second connection 2 is thus closed in rest state (non-energized coil).

Figure 2:
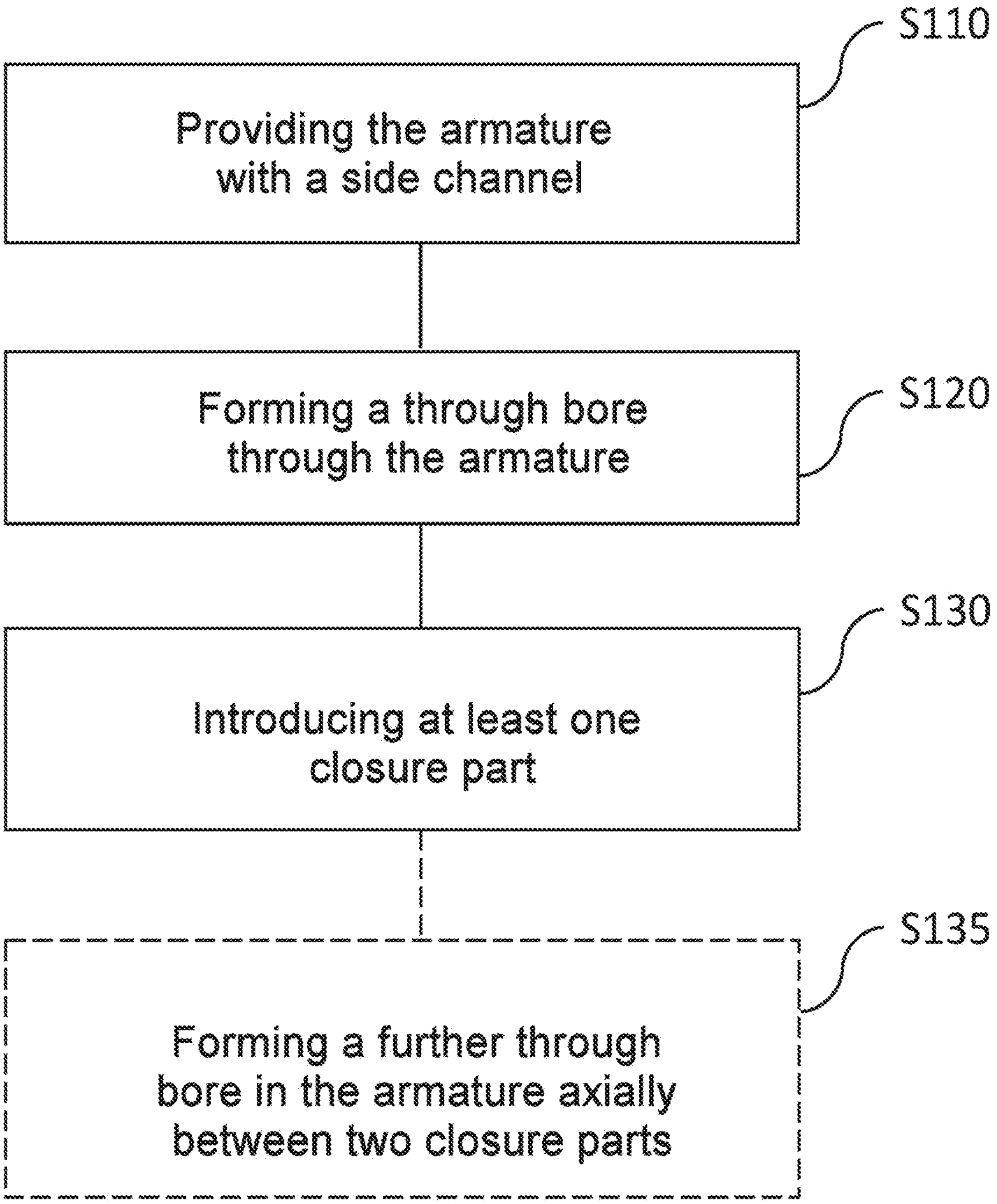
FIG. 2 shows a schematic flow diagram for a production process for a solenoid valve from FIG. 1.

FIG. 2 shows schematically a flow diagram for a method for production of an above-described solenoid valve. The method comprises:

provision S110 of the armature 5 with a side channel 14;

formation S120 of a passage bore 13 through the armature 5; and insertion S130 of at least one closing part 7; 7*a*, 7*b* in the armature.

The steps are performed such that after the step of insertion S130, the armature 5 has a portion 5*a* protruding axially over the at least one closing part 7; 7*a*, 7*b*, and the passage bore 13 is formed in the protruding portion 5*a* in order to conduct an air stream from the first connection 1 to the third connection 3.

The passage bore 13 may be a first passage bore 13*a* and the at least one closing part 7*a*, 7*b* may comprise a first closing part 7*a* and a second closing part 7*b*. Optionally, the method may furthermore comprise formation S135 of a second passage bore 13*b* in a region 5*b* of the armature 5 which lies axially between the first closing part 7*a* and the second closing part 7*b*.

Optionally, as a further method step, the method comprises formation S135 of a stop for the second closing part 7*b* in order to ensure a fixing of the first closing part 7*a*, the second closing part 7*b* and the damping spring 8 arranged in between, inside the cylindrical cavity of the armature 5. Formation of the stop may for example comprise insertion of the disc 9 and upsetting an edge of the armature 5. Then the disc 9 can no longer be removed from the depression without destruction.

It is understood that all above-described other features of the solenoid valve may be implemented as further optional method steps in production. It is also understood that the order in which they are listed is not necessarily an order of performance of the method steps. The steps may also be performed in a different order, or only some methods steps performed.

The mounting and media guidance may be summarized as follows:

The mounting order may therefore be as follows: firstly the cylindrical armature 5 is provided in which the first closing part 7*a* is inserted. The first closing part 7*a* comprises a head region and a shoulder region, wherein the radially inwardly extending protrusions 5*c* of the armature 5 act on the shoulder region and offer a stop, so that the first closing part 7*a* is movable only up to the radial protrusions. Then the damping spring 8 may be inserted in the cylindrical armature 5. Finally, the second closing part 7*b* is placed on the damping spring 8. Then lastly, the disc 9 is inserted. Since the second closing part 7*b* also has a shoulder portion and a head portion, the disc impacts the shoulder region and thus offers a stop for the second closing part 7*b*. For this, the armature 5 comprises the circumferential recess 5*b* in which the disc 9 can be inserted. After upsetting of the armature 5 at an axial end, it is no longer possible to remove the disc 9 and thus the second closing part 7*b* cannot be removed from the interior of the armature 5, since deformation of the axial end of the armature 5 prevents removal of the disc 9. Then the armature together with the core 4 can be inserted in the interior of the valve housing 10 and, after fixing of the core 9, the solenoid valve is ready for use.

The air movement in the individual switch positions follows the passage openings 13 and the outer grooves 14. For this, one or more grooves 14 are provided along the outer cylindrical surface of the armature 5, and allow an axial air stream into or from the third connection 3. The medium (air) is therefore guided from the first connection 1 to the third connection 3 through the core valve seat 12, and is conducted through the transverse bore 13 in the armature 5. From the transverse bore 13 in the armature 5, the air travels further via said outer grooves to the third connection 3.

One advantage of this airflow is that the outer grooves 14 of the armature 5 may already be present in the pre-material and need not be produced separately. This can for example be achieved by a turning process before production of the armature 5. This saves process time and hence also costs. The transverse bore 13 in the armature 5 allows airflow both from inside to outside and from outside to inside. Also, the transverse bores 13 which serve for airflow between the first connection 1 and third connection 3 may be identical in structure to the transverse bore 13 which achieves a pressure balance between the first closing part 7*a* and the second closing part 7*b*.

The features of the invention disclosed in the description, the claims and the figures may be essential to the implementation of the invention both individually and also in combination.

The LIST OF REFERENCE SIGNS is as follows:

1, 2, 3 Connections
4 Core
4*e* (Inner) cone portion
5 Armature
5*a*, 5*b*, 5*c*, 5*d*, 5*e* Armature portions
6 Coil
7, 7*a*, 7*b*, Closing part(s)
8 Damping spring
9 Disc
10 Housing body
11 Compression spring
12 Valve seat (core)
13,13*a*,13*b* Passage openings
14 Side channel, groove
15 Chamber (interior)
17*a*,17*b* Constricted region (shoulder-head region/portion)

The invention claimed is:

1. A solenoid valve, comprising:
a first connection;
a second connection;
a third connection;
at least one closing part for opening and closing the first connection and the second connection;
an armature for moving the at least one closing part, wherein the armature extends as a cylinder around the at least one closing part; and
a coil for moving the armature;
a core in which the first connection is formed as an axially extending passage opening;
wherein the armature has a portion protruding axially beyond the at least one closing part in a direction toward the core, wherein the portion has a transverse bore and the armature has an axially running side channel to conduct an air flow from the first connection to the third connection, the transverse bore connecting an inner region of the armature to the side channel.

2. The solenoid valve of claim 1,
wherein the armature has a closed end face which faces the core.

3. The solenoid valve of claim 1, wherein the armature has an end face which faces the core, wherein the end face of the armature forms a cone, and wherein the core forms an inner cone on a side of the core facing the armature to enlarge a magnetic surface.

4. The solenoid valve of claim 3, wherein the inner cone of the core and the cone of the armature are each formed by two angled regions.

5. The solenoid valve of claim 2, wherein the at least one closing part has a first closing part and a second closing part, wherein the first closing part is coupled to the armature and opens or closes the first connection on a movement of the armature, and the second closing part is coupled to the armature and closes or opens the second connection on a movement of the armature, and
wherein the solenoid valve furthermore has at least one damping spring which is arranged between the first closing part and the second closing part and is configured to damp the closure of the first connection and/or the second connection.

6. The solenoid valve of claim 5, wherein the transverse bore is a first passage opening, wherein the armature has a second passage opening in a region which is formed axially between the first closing part and the second closing part to provide a pressure balance between the inner region of the armature and the third connection.

7. The solenoid valve of claim 6, wherein the first passage opening and the second passage opening are identical bores.

8. The solenoid valve of claim 5, wherein:
the first and second closing parts each have a head-shoulder region for closing the associated first or second connection, and
the armature has a protrusion extending radially into an interior of the armature and, at an opposite end, an annular recess with a stop element,
the protrusion is configured to form a stop for the head-shoulder region of the first closing part, and the recess is configured, after insertion of the first closing part, the damping spring and the second closing part, to fix the second closing part relative to the axial direction via the stop element.

9. The solenoid valve of claim 8, wherein the stop element includes a disc which is fixed inside the recess by upsetting an edge of the armature.

10. The solenoid valve of claim 8, wherein the first closing part is identical to the second closing part, and only a damping spring is arranged between the first closing part and the second closing part, which spring presses the first closing part and the second closing part away from one another.

11. The solenoid valve of claim 8, wherein the solenoid valve has a chamber into which the armature together with the at least one closing part is linearly movable, and the first, second and third connections provide a connection into the chamber, wherein in an energized state of the coil, the at least one closing part closes the first connection and creates a fluidic connection via the chamber between the second connection and the third connection, and wherein in a non-energized state of the coil, the at least one closing part closes the second connection and creates a fluidic connection via the chamber between the first connection and the third connection.

12. The solenoid valve of claim 1, wherein the side channel is at least one groove extending axially along an outer surface of the armature.

13. A method for production of a solenoid valve, the solenoid valve having a first connection, a second connection, a third connection, an armature with a cylindrical interior, a coil for moving the armature, and a core in which the first connection is formed as an axially extending passage opening, the method comprising:

providing the armature with a side channel;

forming a transverse passage bore through the armature; and inserting at least one closing part in the armature, the at least one closing part configured to open and close the first connection and the second connection;

wherein after the inserting of the at least one closing part in the armature, the armature has a portion protruding axially beyond the at least one closing part in a direction toward the core, and the transverse passage bore is formed in the protruding portion to conduct an air stream from the first connection to the third connection, the transverse passage bore connecting an inner region of the armature to the side channel.

14. The method of claim 13, wherein the transverse passage bore is a first passage bore and the at least one closing part includes a first closing part and a second closing part, further comprising:

forming a second passage bore in a region of the armature which lies axially between the first closing part and the second closing part.

* * * * *